United States Patent
Itagaki (10) Patent No.: US 7,525,082 B2
(45) Date of Patent: Apr. 28, 2009

(54) SYSTEM AND METHOD FOR PERFORMING OPTICAL NAVIGATION ON GLASS-LIKE NAVIGATION SURFACES

(75) Inventor: Nobutaka Itagaki, Tokyo (JP)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 11/829,874

(22) Filed: Jul. 27, 2007

(65) Prior Publication Data

US 2009/0026351 A1    Jan. 29, 2009

(51) Int. Cl.
    *G06F 3/033* (2006.01)
(52) U.S. Cl. .................... 250/221; 345/166
(58) Field of Classification Search ............. 250/221; 345/163, 166; 382/107
    See application file for complete search history.

(56) References Cited

U.S. PATENT DOCUMENTS

| | | | |
|---|---|---|---|
| 6,995,748 B2 * | 2/2006 | Gordon et al. | 345/166 |
| 7,193,203 B1 * | 3/2007 | Mau et al. | 250/221 |
| 7,256,387 B2 * | 8/2007 | Kwak | 250/221 |
| 2005/0110776 A1 * | 5/2005 | Tan et al. | 345/179 |
| 2006/0028447 A1 * | 2/2006 | Vook | 345/163 |
| 2006/0132921 A1 | 6/2006 | Hunter et al. | |
| 2007/0090279 A1 | 4/2007 | Venkatesh | |

* cited by examiner

*Primary Examiner*—Stephen Yam (57) ABSTRACT

A system and method for performing optical navigation addresses M×N photosensitive elements of an image sensor array to capture first frames of image data of a navigation surface when set to a first operational mode such that each of the first frames of image data includes M×N sampled signals, and addresses at most the M×N photosensitive elements of the image sensor array to capture second frames of image data of the navigation surface when set to a second operational mode such that each of said second frames of image data includes less than M×N sampled signals.

20 Claims, 8 Drawing Sheets

SYSTEM AND METHOD FOR PERFORMING OPTICAL NAVIGATION ON GLASS-LIKE NAVIGATION SURFACES

BACKGROUND OF THE INVENTION

Optical navigation systems detect relative movements between the optical navigation systems and navigation surfaces to perform tracking operations. An optical navigation system uses a light source, such as a light-emitting diode or a laser diode, to illuminate a navigation surface and an image sensor to successively capture optical features of the illuminated navigation surface as frames of image data. These optical features are usually visual surface variations. The optical navigation system compares the successive image frames and estimates the relative movements between the optical navigation system and the navigation surface based on the comparison between the current image frame and a previous image frame. The optical navigation system is able to track the relative movements between the optical navigation system and the navigation surface by continuously capturing and comparing image frames.

Optical navigation systems are commonly used in optical computer mice to track the movements of the mice relative to the surfaces on which the mice are manually manipulated. The tracked movements of an optical computer mouse are used to control a cursor on a computer screen. On a typical navigation surface such as a desktop or a mouse pad, a conventional optical navigation system operates well to track the movements of the mouse across the navigation surface. However, on a clean glass surface, the conventional optical navigation system may not operate accurately or even completely fail to track the movements of the mouse. This is due to the fact that, on a clean glass surface, there may not be sufficient visual surface variations that are detectable by the conventional optical navigation system to properly track the movements of the mouse.

In view of this concern, there is a need for a system and method for performing optical navigation that can operate on different navigation surfaces, including a clean glass surface, in an efficient and effective manner.

SUMMARY OF THE INVENTION

A system and method for performing optical navigation addresses M×N photosensitive elements of an image sensor array to capture first frames of image data of a navigation surface when set to a first operational mode such that each of the first frames of image data includes M×N sampled signals, and addresses at most the M×N photosensitive elements of the image sensor array to capture second frames of image data of the navigation surface when set to a second operational mode such that each of said second frames of image data includes less than M×N sampled signals. The second operational mode is used when the navigation surface is a glass-like surface, while the first operation mode is used when the navigations surface is not a glass-like surface. Thus, the system and method can be used on different types of navigation surfaces, including glass-like surfaces.

A method for performing optical navigation on a navigation surface in accordance with an embodiment of the invention comprises setting an image capturing mode to one of a first operational mode and a second operational mode based on the navigation surface, electronically capturing the navigation surface using M×N photosensitive elements of an image sensor array as first frames of image data when the image capturing mode is set to the first operational mode, including addressing the M×N photosensitive elements such that each of the first frames of image data includes M×N sampled signals, electronically capturing the navigation surface using at most the M×N photosensitive elements of the image sensor array as second frames of image data when the image capturing mode is set to the second operational mode, including addressing at most the M×N photosensitive elements such that each of the second frames of image data includes less than M×N sampled signals, and processing the first and second frames of image data to determine relative displacements using at least some of the first and second frames of image data.

A system for optical navigation in accordance with an embodiment of the invention comprises an image sensor array, a decoding unit, a mode selector, a processor and an image processing module. The image sensor array includes M×N photosensitive elements positioned to receive light reflected from a navigation surface. The decoding unit is operatively connected to the image sensor array to selectively address the M×N photosensitive elements of the image sensor array. The mode selector is operatively connected to the decoding unit to set an image capturing mode to one of a first operational mode and a second operational mode based on the navigation surface. The processor is operatively connected to the decoding unit and the mode selector to instruct the decoding unit to selectively address the M×N photosensitive elements of the image sensor array depending on the image capturing mode. The processor is configured to instruct the decoding unit to selectively address the M×N photosensitive elements of the image sensor array to capture first frames of image data of the navigation surface when the image capturing mode is set to the first operational mode such that each of the first frames of image data includes M×N sampled signals. The processor is further configured to instruct the decoding unit to selectively address at most the M×N photosensitive elements to capture second frames of image data of the navigation surface when the image capturing mode is set to the second operational mode such that each of the second frames of image data includes less than M×N sampled signals. The image processing module is operatively connected to the image sensor array to receive the first and second frames of image data. The image processing module is configured to correlate the first and second frames of image data to determine relative displacements using at least some of the first and second frames of image data.

A system for optical navigation in accordance with another embodiment of the invention comprises a light source, an image sensor array, an ion generator, a decoding unit, a processor and an image processing module. The light source is configured to emit light. The image sensor array includes M×N photosensitive elements positioned to receive the light reflected from a navigation surface. The ion generator is configured to inject ions onto the navigation surface. The decoding unit is operatively connected to the image sensor array to selectively address the photosensitive elements of the image sensor array. The processor is operatively connected to the decoding unit to instruct the decoding unit to selectively address the M×N photosensitive elements of the image sensor array to capture the navigation surface as frames of image data. The image processing module is operatively connected to the image sensor array to receive said frames of image data. The image processing module is configured to correlate the second frames of image data to determine relative displacements using at least some of the frames of image data.

Other aspects and advantages of the present invention will become apparent from the following detailed description,

DETAILED DESCRIPTION

Figure 1:
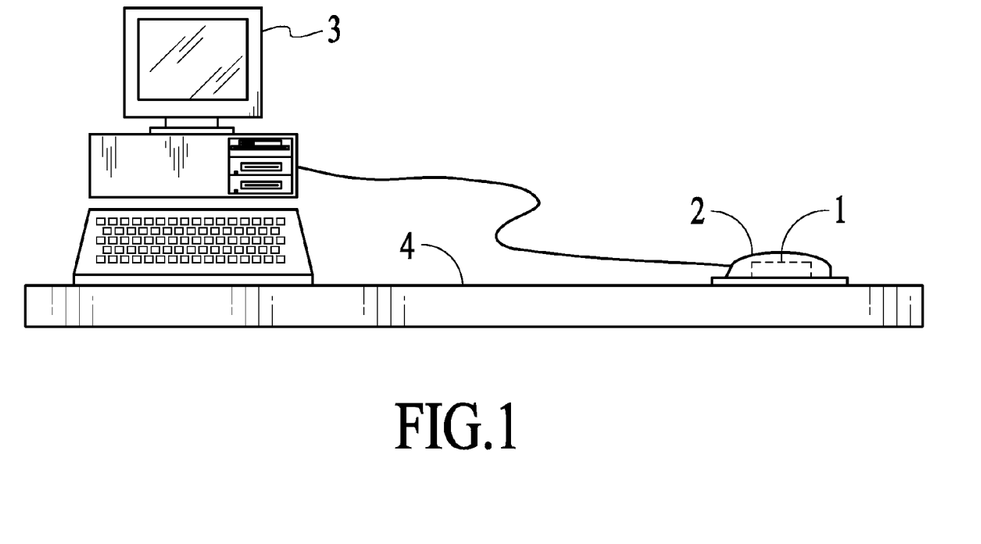
FIG. 1 shows an optical navigation system included in an optical computer mouse in accordance with an embodiment of the invention.

With reference to FIG. 1, an optical navigation system 1 in accordance with an embodiment of the invention is described. As shown in FIG. 1, the optical navigation system 1 is included in an optical computer mouse 2, which is connected to a computer 3. In this implementation, the optical navigation system 1 is used to track the movements of the optical mouse 2 as the optical mouse is manipulated over a navigation surface 4 by a user to control a cursor displayed on the computer 3. However, in other implementations, the optical navigation system 1 can be used in different products for various tracking applications. As described in more detail below, the optical navigation system 1 is designed to operate effectively on various navigation surfaces, including glass or glass-like surfaces, which are difficult surfaces to track using optical navigation.

Figure 2:
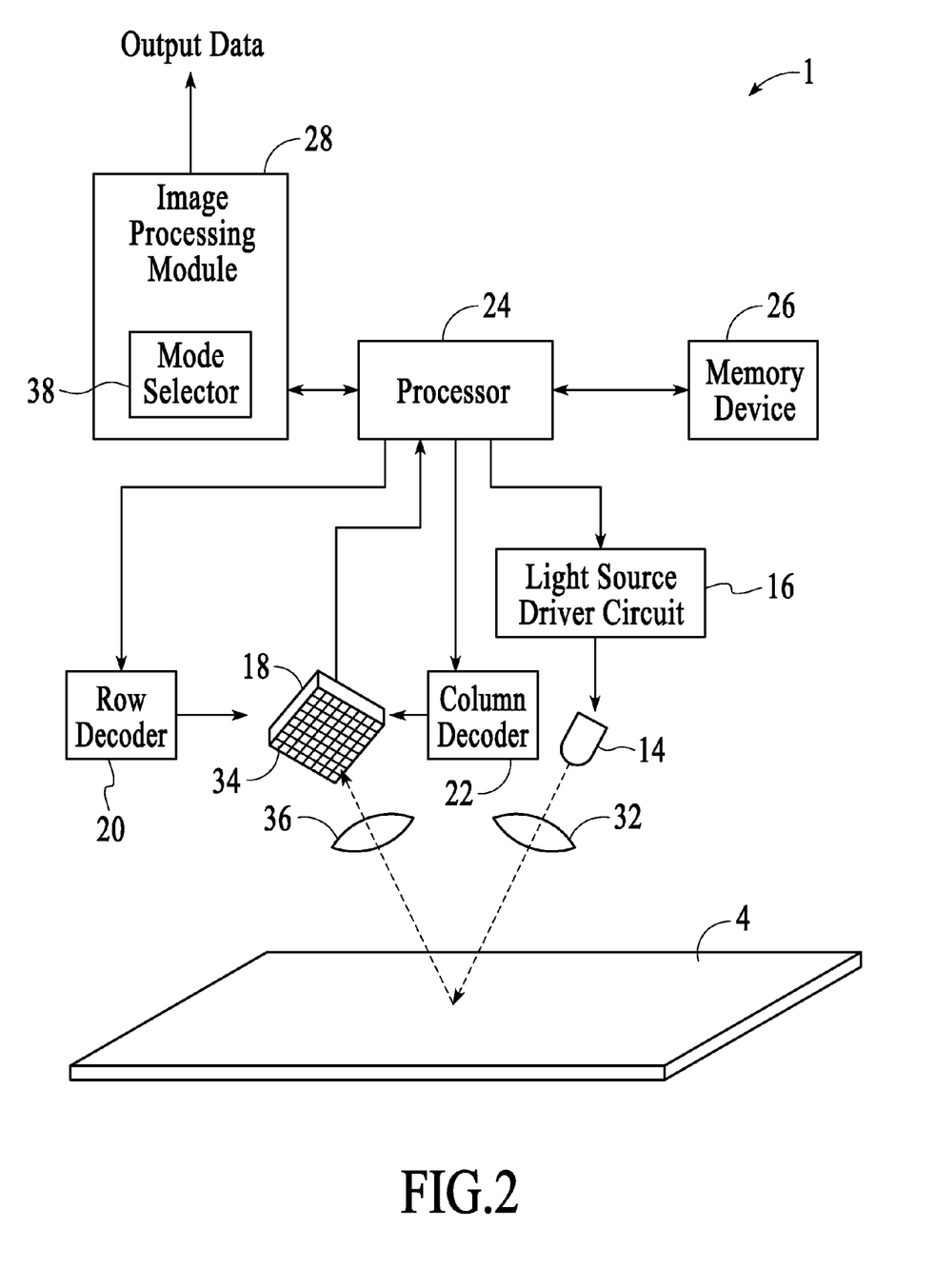
FIG. 2 is a block diagram of the optical navigation system in accordance with an embodiment of the invention.

As shown in FIG. 2, the optical measuring system 1 includes a light source 14, a light source driver circuit 16, an image sensor array 18, a row decoder 20, a column decoder 22, a processor 24, a memory device 26 and an image processing module 28. Although these components of the optical navigation system 1 are shown in FIG. 2 as being separate components, some of these components may be integrated into fewer elements. As an example, the light source driver circuit 16, the image sensor array 18, the row and column decoders 20 and 22, the processor 24, the memory device 26 and the image processing module 28 may be integrated into a single integrated circuit (IC) chip.

The light source 14 is configured to generate light, which provides illumination on the navigation surface 4. As the navigation surface 4 and/or the optical navigation system 1 are displaced with respect to each other, different areas of the navigation surface 4 are illuminated by the light from the light source 14. In this embodiment, the light source 14 is a laser diode, such as a vertical cavity surface emitting laser, that generates coherent light. However, in other embodiments, the light source 14 can be any type of a light source, such as a light-emitting diode. The light source 14 is activated by the light source driver circuit 16, which provides driving signals to the light source. A lens 32 may be used with the light source 14 to focus and/or collimate the light from the light source onto the desired area of the navigation surface 4.

The image sensor array 18 is configured to electronically capture light reflected from illuminated areas of the navigation surface 4 as frames of image data. The image sensor array 18 includes M×N photosensitive pixel elements 34, where M may equal N. The photosensitive pixel elements 34, which are sometimes referred to herein as "pixels", generate image data in the form of electrical signals in response to light incident on the elements. In this embodiment, the image sensor array 18 is a complementary metal oxide semiconductor (CMOS) image sensor array. However, in other embodiments, the image sensor array 18 may be a different type of an image sensor array, such as a charged-coupled device (CCD) image sensor array. A lens 36 may be used with the image sensor array 18 to focus light reflected off the navigation surface 4 onto the image sensor array.

The photosensitive pixel elements 34 of the image sensor array 18 are smaller than photosensitive pixel elements of an image sensor array commonly found in a conventional optical navigation system, which are typically 30 μm to 60 μm in size. Thus, each of the photosensitive pixel elements 34 of the image sensor array 18 is smaller than 30 μm in size. In an embodiment, each of the photosensitive pixel elements 34 of the image sensor array 18 is between 5 μm to 20 μm in size. The smaller size of the photosensitive pixel elements 34 allows the image sensor array 18 to detect patterns of speckles produced by the navigation surface 4. A speckle pattern is a random intensity produced by the mutual interference of coherent wavefronts that are subject to phase differences and/or intensity fluctuations.

The size of photosensitive pixel elements of a conventional image sensor is much larger than the size of speckles produced by a clean glass surface. Thus, a conventional image sensor array is not able to detect speckle patterns from a clean glass surface for optical tracking. However, since the size of the photosensitive pixel elements 34 of the image sensor array 18 is much smaller than the size of photosensitive pixel elements of a conventional image sensor array, the image sensor array 18 is able to detect the speckle patterns from a clear glass surface or other similar surfaces for optical tracking.

In order to perform optical tracking at high speeds using the smaller photosensitive pixel elements 34, a large number of photosensitive pixel elements are needed. Thus, in some embodiments, the image sensor array 18 includes 40×40 to 80×80 photosensitive pixel elements. However, the large number of photosensitive pixel elements also has a negative impact on the tracking speed. As the number of photosensitive pixel elements 34 is increased, the frame rate is decreased, i.e., the frame rate becomes slower, which limits the maximum tracking speed.

In general, the maximum tracking speed, V_max is mathematically described as:

$$V\_max = \alpha\_size \times N \times (1 - overlapped\ area) \times frame\_rate,$$

where $\alpha\_size$ is the pixel size, N is the number of pixels in each of the rows and columns. Using applicable numbers in the above equation for the image sensor array 18, an expected maximum tracking speed using the image sensor array 18 can be calculated as follows:

$$V\_max = 11\mu m \times 64 \times (1 - 70\%) \times 600 = 127 mm/s.$$

A maximum tracking speed of 127 mm per second does not satisfy current market requirements, especially for ordinary or non-glass navigation surfaces. Thus, the tracking speed should be increased for non-glass navigation surfaces without adversely affecting the tracking performance for glass navigation surfaces. This can be achieved by using fewer photosensitive pixel elements 34 of the image sensor array 18 to capture a frame of image data when the navigation surface 4 is a non-glass surface in order to increase the frame rate, which increases the maximum tracking speed. Speckle size for non-glass surfaces is significantly larger than that for glass surfaces because surface contour variations for non-glass surfaces are greater than those for glass surfaces. As a result, the intensity of speckle light from non-glass surfaces is much higher than the intensity of speckle light from glass surfaces. Since the speckle intensity is much higher on non-glass surfaces, the image signals from each of the photosensitive pixel elements 34 of the image sensor array 18 is not needed to effectively perform optical tracking.

Consequently, the optical navigation system 1 operates in different modes, depending on whether the navigation surface 4 is a first type of surface that generates small speckles, such as clean glass surfaces or the like, or a second type of surface that generates larger speckles, such as non-glass surfaces. On a first type of navigation surface, the optical navigation system 1 operates in a first mode, which involves comparing frames of image data that are captured using all the active M×N photosensitive pixel elements 34 of the image sensor array 18. Thus, in the first mode of operation, each captured image frame includes M×N sampled signals from the M×N photosensitive pixel elements 34. On a second type of navigation surface, the optical navigation system 1 operates in a second mode, which involves comparing frames of image data that are captured using at most the M×N photosensitive pixel elements 34 of the image sensor array 18 such that each captured image frame includes less than M×N sampled image signals. Since the frame rate is affected by the number of signals sampled from an image sensor array to capture frames of image data, the frame rate can be increased by sampling fewer photosensitive pixel elements to capture frames of image data for optical tracking or sampling the photosensitive pixel elements in a way to extract fewer signals from the image sensor array. Using these different modes of operation for different navigation surfaces, the maximum tracking speed on non-glass navigation surfaces can be effectively increased without compromising the tracking performance on glass or glass-like navigation surfaces.

Figure 3A:
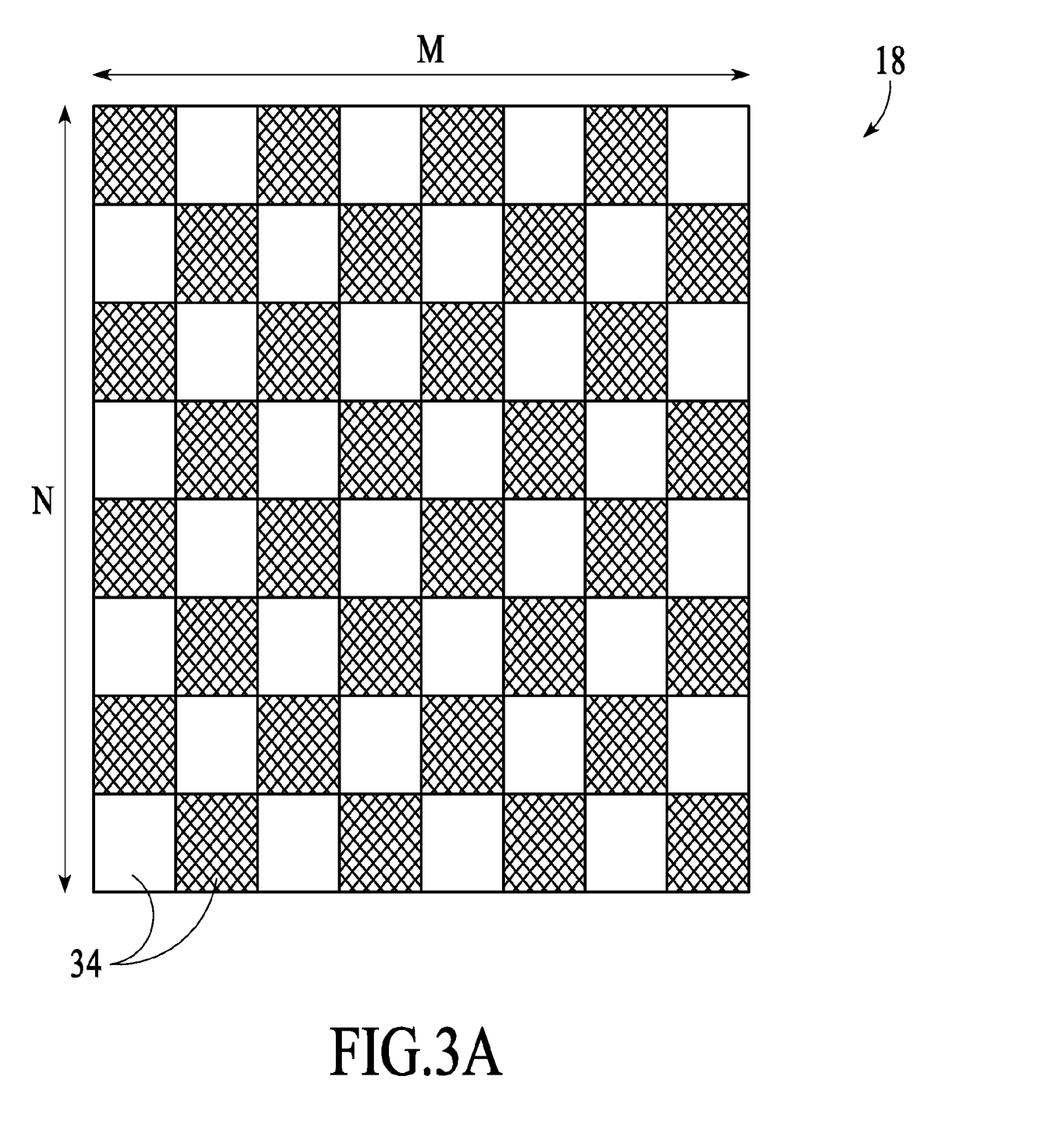
FIGS. 3A-3C illustrate photosensitive pixel elements of an image sensor array of the optical navigation system that are addressed to electronically capture frames of image data when the optical navigation system is set to a second operating mode in accordance with different embodiments of the invention.

In an embodiment, as illustrated in FIG. 3A, frames of image data are captured by addressing or sampling every $n^{th}$ photosensitive pixel elements 34 in each row or column of the image sensor array 18, where n is an integer greater than one, when the optical navigation system 1 is operating in the second mode. These photosensitive pixel elements 34 of the image sensor array 18 that are used to capture frames of image data are referred to herein as being "active" and are indicated in FIG. 3A as being crosshatched. In FIG. 3A, frames of image data are captured by addressing or sampling every other photosensitive pixel elements 34 in each row or column of the image sensor array 18 when the optical navigation system 1 is operating in the second mode. Thus, each captured image frame includes less than M×N sampled signals from the M×N photosensitive pixel elements 34.

As illustrated in FIG. 3A, these "active" photosensitive pixel elements 34 may be staggered in the rows of the image sensor array 18 such that the active photosensitive pixel elements 34 are arranged in a checkerboard configuration. However, in other embodiments, these active photosensitive pixel elements 34 may not be staggered such that the photosensitive elements 34 in every other column or row are active. In this embodiment, only half of the M×N photosensitive pixel elements 34 of the image sensor array 18 are used when the optical navigation system 1 is operating in the second mode, which increases the frame rate by a factor of two.

Figure 3B:
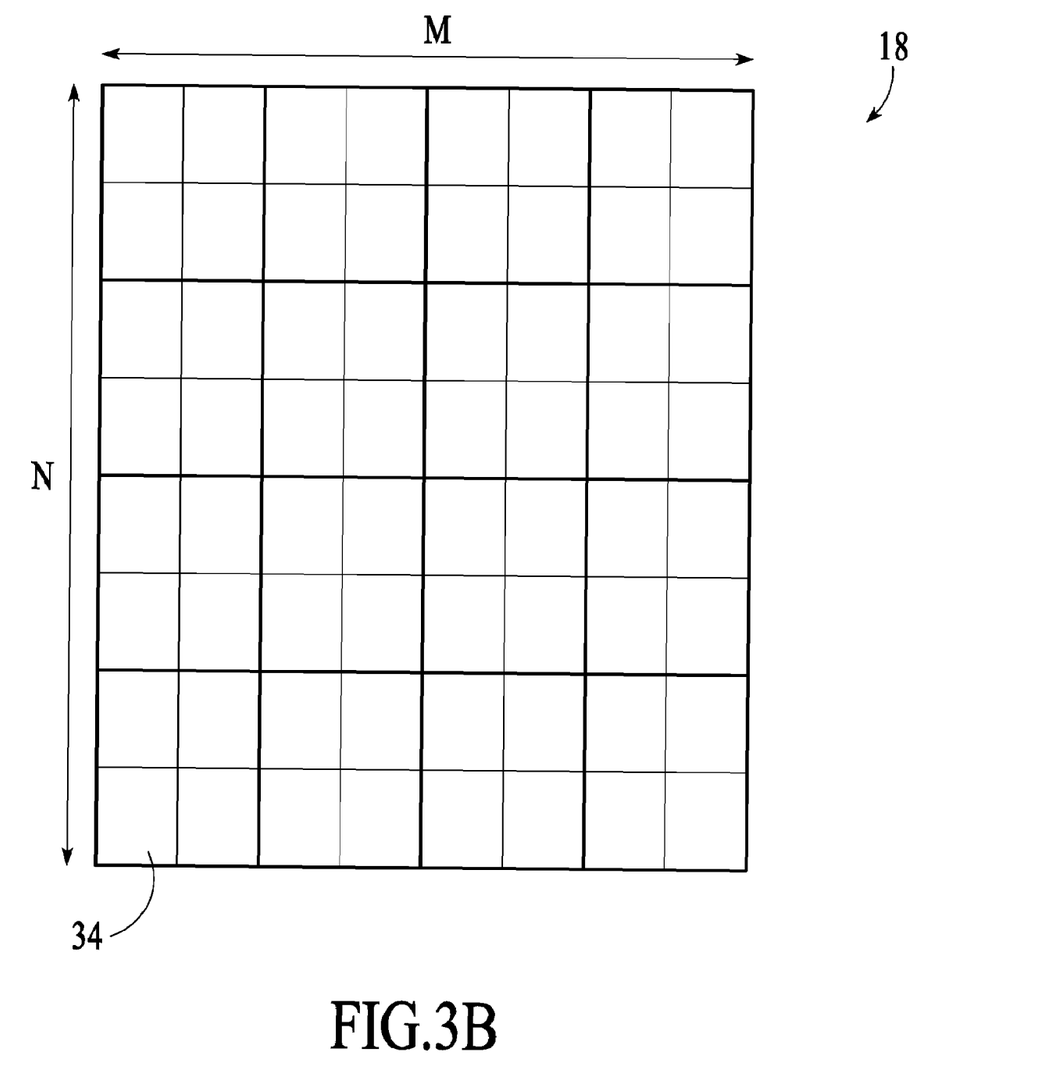

In another embodiment, as illustrated in FIG. 3B, frames of image data are captured by addressing or sampling blocks of the M×N photosensitive pixel elements 34 of the image sensor array 18 to extract a single image signal from each addressed pixel block instead of addressing or sampling individual photosensitive pixel elements when the optical navigation system 1 is operating in the second mode. Thus, each captured image frame includes less than M×N sampled signals from the M×N photosensitive pixel elements 34. As an example, 2×2 blocks of the M×N photosensitive pixel elements 34 of the image sensor array 18 are addressed or sampled to extract a single image signal from each addressed 2×2 block. Thus, the photosensitive pixel elements 34 in each of the 2×2 blocks of the image sensor array 18 are collectively sampled and processed to extract a single image signal. In this embodiment, since 2×2 blocks of photosensitive pixel elements 34 are sampled to capture each frame of image data, the frame rate is increased by a factor of four. In other embodiments, larger blocks of the M×N photosensitive pixel elements 34 of the image sensor array 18 may be addressed or sampled to capture frames of image data when the optical navigation system 1 is operating in the second mode in order to further increase the frame rate.

Figure 3C:
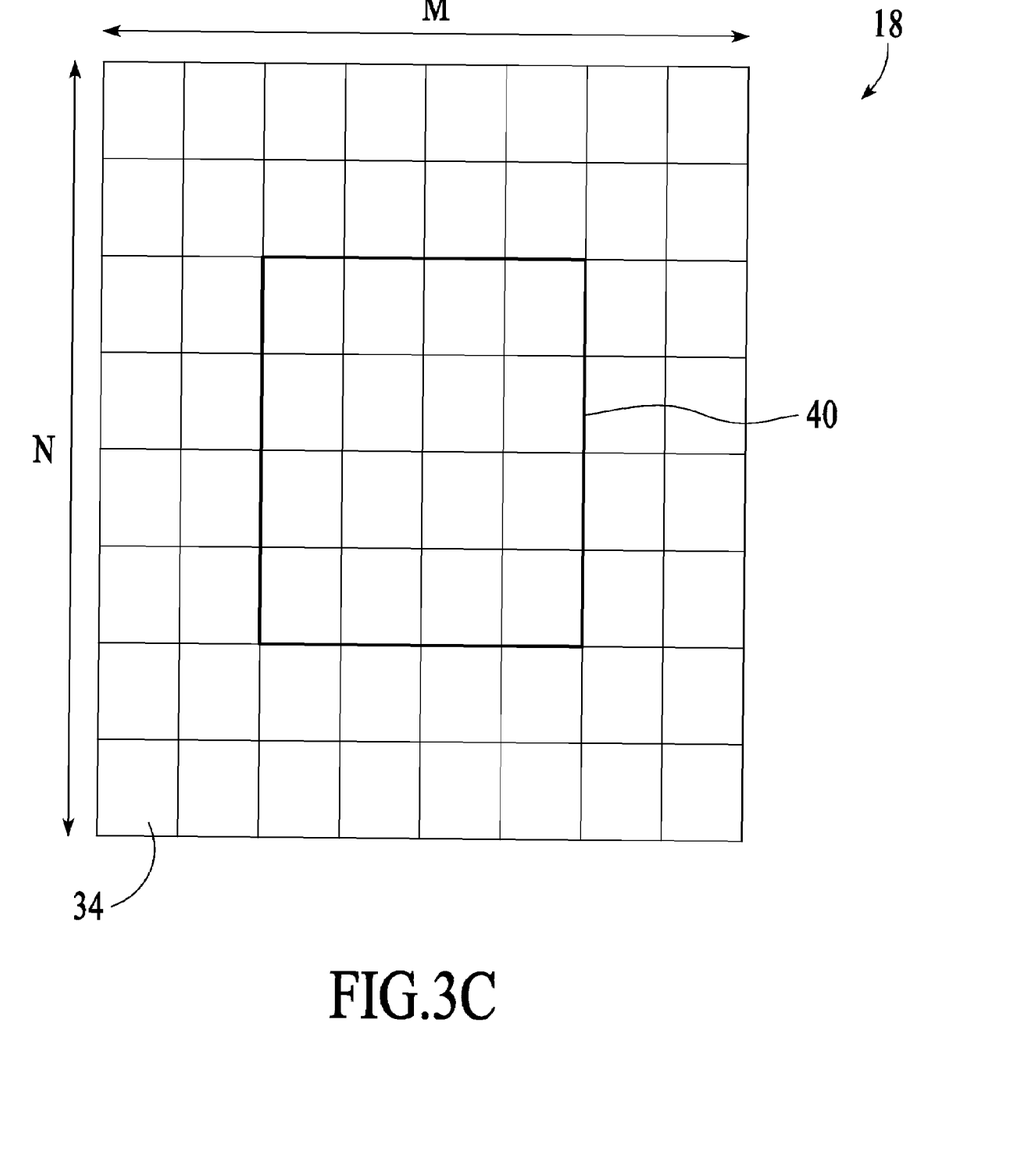

In another embodiment, as illustrated in FIG. 3C, frames of image data are captured by addressing or sampling a portion 40 of the M×N photosensitive pixel elements 34 of the image sensor array 18 when the optical navigation system 1 is operating in the second mode. As an example, assuming that the image sensor array 18 is a 64×64 sensor array, only the photosensitive pixel elements in a 32×32 block of the M×N photosensitive pixel elements 34 of the image sensor array 18 may be individually addressed or sampled to capture frames of image data when the optical navigation system 1 is operating in the second mode. In FIG. 3C, these "active" photosensitive pixel elements 34 of the image sensor array 18 are indicated as being located within the portion 40 of the image sensor array 18. In one implementation, the 32×32 block of active photosensitive pixel elements 34 may be centered in the image sensor array 18. However, in other implementations, the 32×32 block of active photosensitive pixel elements 34 may be located anywhere in the image sensor array 18. In this embodiment, only quarter of the photosensitive pixel elements 34 of the image sensor array 18 are addressed or sampled when the optical navigation system 1 is operating in the second mode, which increases the frame rate by a factor of four. In other embodiments, a smaller or larger block of photosensitive pixel elements 34 in the image sensor array 18, which may represent less than or greater than quarter of the image sensor array, can be used to capture frames of image data when the optical navigation system 1 is operating in the second mode.

Turning back to FIG. 2, the row and column decoders 20 and 22 of the optical navigation system 1 are electrically connected to the photosensitive pixel elements 34 of the image sensor array 18. The row and column decoders 20 and 22 can be considered collectively as a decoding unit. The row decoder 20 is configured to selectively address the rows of the M×N photosensitive pixel elements 34 of the image sensor array 18 to extract or readout the image signals from the addressed photosensitive pixel elements. Similarly, the column decoder 22 is configured to selectively address the columns of the M×N photosensitive pixel elements 34 of the image sensor array 18 to extract or readout the image signals from the addressed photosensitive pixel elements. When the optical navigation system 1 is operating in the first mode, the row and column decoders 20 and 22 address all the M×N photosensitive pixel elements 34 of the image sensor array 18 to capture frames of image data. When the optical navigation system 1 is operating in the second mode, the row and column decoders 20 and 22 may selectively address only the active photosensitive pixel elements 34 of the image sensor array 18, as illustrated in FIGS. 3A and 3C, to capture frames of image data. Alternatively, when the optical navigation system 1 is operating in the second mode, the row and column decoders 20 and 22 may address blocks of the M×N photosensitive pixel elements 34 of the image sensor array 18, as illustrated in FIG. 3B, to capture frames of image data.

The processor 24 is electrically connected to the light source driver circuit 16 and the row and column decoders 20 and 22 in order to control the processes of capturing the navigation surface 4 as frames of image data using speckle light from the navigation surface. The processor 24 provides control signals to the light source driver circuit 16 to direct the light source driver circuit to apply driving signals to the light source 14 to activate the light source. The processor 24 also provides control signals to the row and column decoders 20 and 22 to direct the row and column driver circuits to selectively address the photosensitive pixels 34 of the image sensor array 18 for integration, readout and reset. Thus, the processor 24 is able to control the frame rate of the image sensor array 18. In general, the processor 24 implements various operations and functions of the optical navigation system 1.

The processor 24 may be a general-purpose digital processor such as a microprocessor or microcontroller. In other embodiments, the processor 24 may be a special-purpose processor such as a digital signal processor. In other embodiments, the processor 24 may be another type of controller or a field programmable gate array (FPGA).

The memory device 26 is configured to store data and/or instructions for use in the operation of the optical navigation system 1. In some embodiments, the memory device 26 stores instructions, which when executed by the processor 24, cause the processor to perform certain operations. However, some instructions may be stored in memory integrated into the processor 24. Additionally, the memory device 26 may store output data of the image processing module 28.

The image processing module 28 is configured to calculate relative displacements between the optical navigation system 1 and the navigation surface 4 using the captured frames of image data of the navigation surface. The image processing module 28 operates to compare or correlate a current frame of image data with a previously captured frame of image data to calculate the relative displacements. Thus, the image processing module 28 can be considered to be a navigation engine that computes relative displacements between the optical navigation system 1 and the navigation surface 4 using the captured frames of image data of the navigation surface. In an embodiment, correlating frames of image data involves determining positional changes of speckle pattern in the frames of image data to calculate the relative displacements between the optical navigation system 1 and the navigation surface 4. The calculated relative displacements may be output as changes in X and Y directions, absolute X and Y coordinates or any other suitable data to indicate displacement between the optical navigation system 1 and the navigation surface 4.

The image processing module 28 may be implemented in any combination of software, hardware and firmware. Thus, in some embodiments, the image processing module 28 may be implemented as a set of computer code instructions stored in the memory device 26 that, when executed by the processor 24, performs the functions of the image processing module 28. In other embodiments, the image processing module 28 is incorporated into the processor 24 as part of the processor.

As illustrated in FIG. 2, the navigation engine 28 includes a mode selector 38, which operates to switch the image capturing mode of the optical navigation system 1 between the first and second modes, depending on the navigation surface 4. If the navigation surface 4 is a glass-like surface, then the mode selector 38 transmits a signal to the processor 24 to enable the first mode of operation. However, if the navigation surface 4 is not a glass-like surface, then the mode selector 38 transmits another signal to the processor 24 to enable the second mode of operation. In an embodiment, the mode selector 38 automatically determines whether the operational mode of the optical navigation system 1 should be switched to the first mode or the second mode using the signal strength of the received speckle light, or the intensity of speckle light from the navigation surface 4. In another embodiment, the mode selector 38 switches the image capturing mode of the optical navigation system 1 between the first and second modes in response to an input, which is manually entered by a user. As an example, a user may enter a command using the computer 3 that is operatively coupled to the optical computer mouse 2 with the optical navigation system 1.

Figure 4:
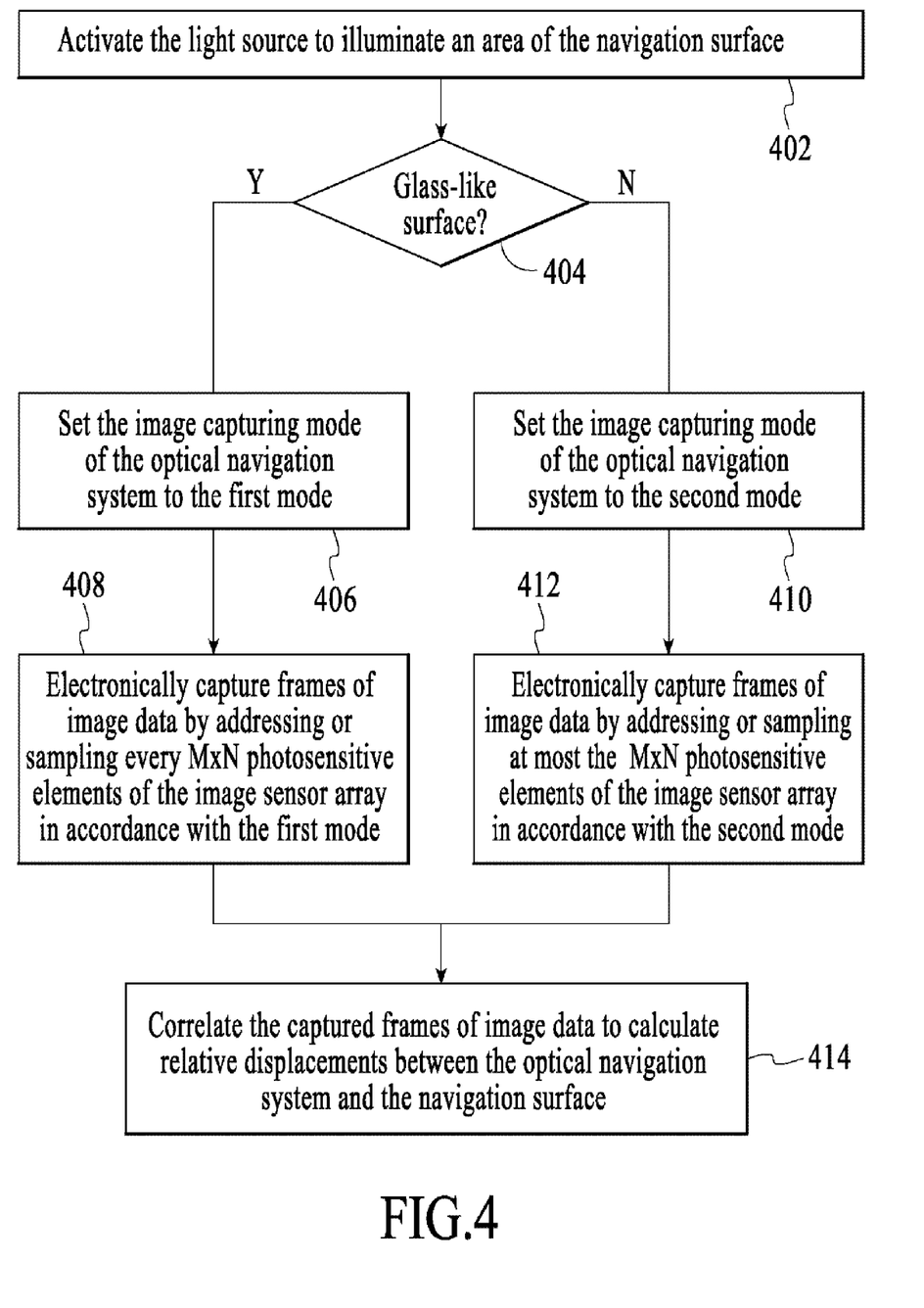
FIG. 4 is a process flow diagram of an overall operation of the optical navigation system in accordance with an embodiment of the invention.

An overall operation of the optical navigation system 1 in accordance with an embodiment of the invention is now described with reference to a flow diagram of FIG. 4 using the illustrated examples of FIGS. 3A-3C. At block 402, the light source 14 is activated to illuminate an area of the navigation surface 4. The light source 14 is activated by a driving signal from the light source driver circuit 16 in response to a control signal from the processor 24.

Next, at block 404, a determination is made by the mode selector 38 whether the navigation surface 4 is a glass-like surface. This determination may be made manually by entering a user command into the optical navigation system 1 using the computer mouse 2 or using the computer system 3. Alternatively, the determination may be made automatically using speckle light from the navigation surface 4 to discriminate between different types of navigation surfaces. In an embodiment, a sample frame of image data is captured using all or some of the photosensitive elements 34 of the image sensor array 18 to measure the signal strength of the speckle light from the navigation surface 4. In some implementations, if some or all of the image data from the different photosensitive elements 34 of the image sensor array 18 are below a threshold value, then the navigation surface 4 is determined to be a glass-like surface. However, if some or all of the image data from the different photosensitive elements 34 of the image sensor array 18 are at or above the threshold value, then the navigation surface 4 is determined not to be a glass-like surface.

If the navigation surface 4 is determined to be a glass-like surface, then the operation proceeds to block 406, where the image capturing mode of the optical navigation system 1 is set to the first mode by the mode selector 38. Next, at block 408, frames of image data are electronically captured by addressing or sampling every M×N photosensitive elements 34 of the image sensor array 18 in accordance with the first operational mode of the optical navigation system 1, as described above.

However, if the navigation surface 4 is determined not to be a glass-like surface, the operation proceeds to block 410, where the image capturing mode of the optical navigation system 1 is set to the second mode by the mode selector 38. Next, at block 412, frames of image data are electronically captured by addressing or sampling some or all of the M×N photosensitive elements 34 of the image sensor array 18 in accordance with the second operational mode of the optical navigation system 1. In an embodiment, the frames of image data are captured by addressing or sampling every $n^{th}$ photosensitive pixel elements 34 of the image sensor array 18, as illustrated in FIG. 3A, where n is 2, 3, 4, etc. In another embodiment, the frames of image data are captured by addressing or sampling blocks of the M×N photosensitive elements 34 of the image sensor array 18 instead of addressing or sampling individual photosensitive pixel elements, as illustrated in FIG. 3B. As an example, 2×2 blocks of M×N photosensitive elements 34 of the image sensor array 18 are collectively sampled to extract a single image signal from each of the blocks. Thus, each pixel block is treated as a single pixel to capture frames of image data. In another embodiment, the frames of image data are captured using a portion of the M×N photosensitive pixel elements 34 of the image sensor array 18, as illustrated in FIG. 3C. As an example, assuming that the image sensor array 18 is a 64×64 sensor array, a 32×32 block of photosensitive pixel elements 34 in the image sensor array 18 may be used to capture frames of image data instead of using the entire 64×64 sensor array.

Next, at block 414, the captured frames of image data are correlated to calculate relative displacements between the optical navigation system 1 and the navigation surface 4. The calculated relative displacements are output as position data, which can be used, for example, to move a cursor displayed on a computer monitor.

Figure 5:
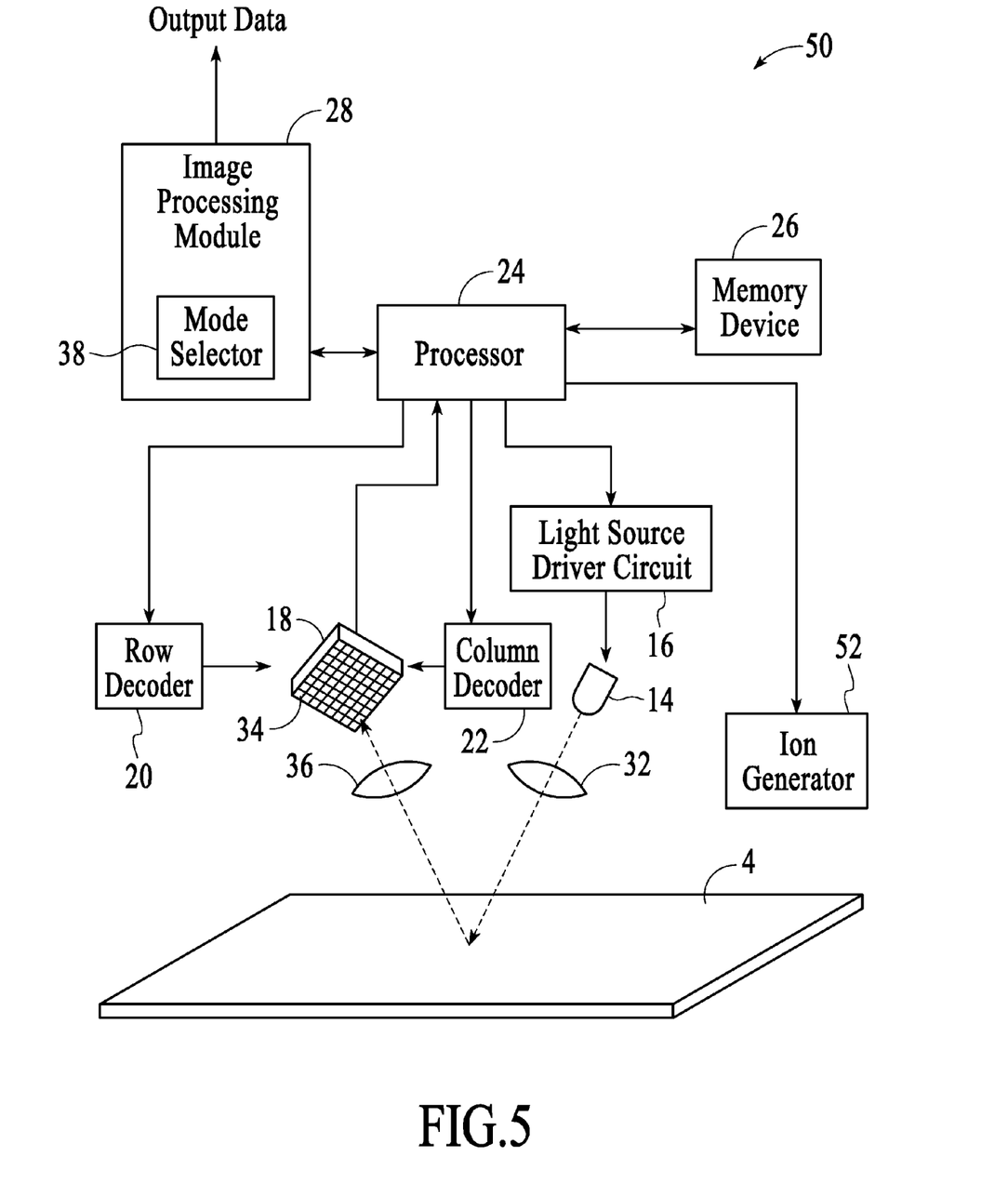
FIG. 5 is a block diagram of an optical navigation system in accordance with another embodiment of the invention.

Turning now to FIG. 5, an optical navigation system 50 in accordance with another embodiment of the invention is described. The optical navigation system 50 is similar to the optical navigation system 1. However, the optical navigation system 50 further includes an ion generator 52, which is connected to and controlled by the processor 24. As described below, the ion generator 52 is used to remove micro-particles from a glass-like navigation surface to improve the tracking performance of the optical navigation system 50 on the glass-like navigation surface.

Speckle light from a surface can change significantly due to various factors. When there are micro-particles on a glass surface, the signal intensity of the speckle light from the glass surface is high. However, on a clean glass surface, the signal intensity of the speckle light from the surface is extremely low. Large signal intensity differences tend to degrade the tracking performance of an optical navigation system. In some cases, the optical navigation system is unable to track or produces results that results in "jumps" between calculated displacements due to signal intensity changes. This problem may be resolved by using a large analog-to-digital converter (ADC) bits. However, this may be difficult to realize from a signal-to-noise ratio (S/N) point of view.

Another solution is to average the speckle signal intensity, which may be achieved by removing or adding micro-particles on the glass surface to get a more uniform distribution of the micro-particles on the glass surface. However, since glass is an insulating material, it is difficult to remove micro-particles from the glass once the micro-particles are attached to the glass. Another reason is that a glass surface is very smooth, which results in a strong bond between the micro-particles and the glass surface due to Van der Waals force.

In general, micro-particles on a glass surface have a charge, either positive or negative. Therefore, if the charge of the micro-particles is neutralized, the micro-particles can detach from the glass surface, reducing the number of micro-particles on the glass surface and averaging the distribution of micro-particles on the glass surface. As a result, the signal intensity of speckle light from the glass surface can be averaged.

The ion generator 52 of the optical navigation system 50 is positioned near the navigation surface 4, which is illuminated by the light source 14. The ion generator 52 injects charged ions toward the navigation surface 4 to neutralize the charge of the micro-particles on the navigation surface, which may be a glass-like surface. Consequently, some of the neutral micro-particles on the navigation surface 4 will detach from the navigation surface. As a result, the distribution of micro-particles on the navigation surface 4 will be more uniform and the speckle signal intensity from the navigation surface will be more consistent, which improves the tracking performance of the optical navigation system 50. In an embodiment, the ion generator 52 is configured to detect the charge polarity of the micro-particles on the navigation surface 4 and inject charged ions having the opposite polarity to neutralize the micro-particle. In another embodiment, the ion generator 52 is configured to inject both positive and negative ions to neutralize the micro-particle on the navigation surface 4. As an example, the ion generator 52 may be an OMRON KS1 ionizer, which is commercially available.

Figure 6:
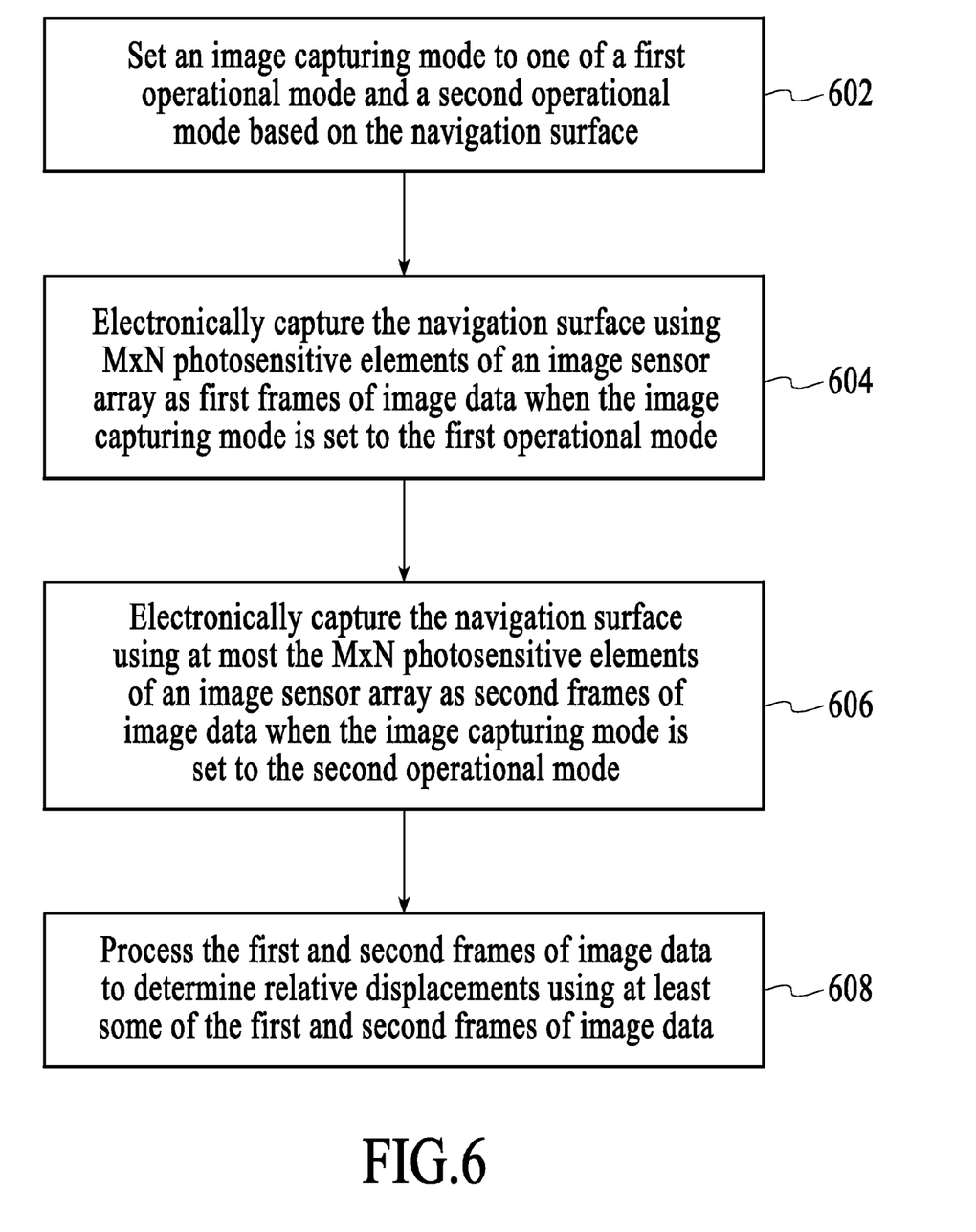
FIG. 6 is a process flow diagram of a method for performing optical navigation in accordance with an embodiment of the invention.

A method for performing optical navigation on a navigation surface in accordance with an embodiment of the invention is described with reference to a process flow diagram of FIG. 6. At block 602, an image capturing mode is set to one of a first operational mode and a second operational mode based on the navigation surface. At block 604, the navigation surface is electronically captured using M×N photosensitive elements of an image sensor array as first frames of image data when the image capturing mode is set to the first operational mode, which includes addressing the M×N photosensitive elements such that each of the first frames of image data includes M×N sampled signals. At block 606, the navigation surface is captured using at most the M×N photosensitive elements of the image sensor array as second frames of image data when the image capturing mode is set to the second operational mode, which includes addressing at most the M×N photosensitive elements such that each of the second frames of image data includes less than M×N sampled signals. At block 608, the first and second frames of image data are processed to determine relative displacements using at least some of the first and second frames of image data.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing optical navigation on a navigation surface, said method comprising:

setting an image capturing mode to one of a first operational mode and a second operational mode based on said navigation surface;

electronically capturing said navigation surface using M×N photosensitive elements of an image sensor array as first frames of image data when said image capturing mode is set to said first operational mode, including addressing said M×N photosensitive elements such that each of said first frames of image data includes M×N sampled signals;

electronically capturing said navigation surface using at most said M×N photosensitive elements of the image sensor array as second frames of image data when said image capturing mode is set to said second operational mode, including addressing at most said M×N photosensitive elements such that each of said second frames of image data includes less than M×N sampled signals; and processing said first and second frames of image data to determine relative displacements using at least some of said first and second frames of image data, said processing including calculating said relative displacements using said first frames of image data when said image capturing mode is set to said first operational mode, said processing including calculating said relative displacements using said second frames of image data when said image capturing mode is set to said second operational mode.

2. The method of claim 1 wherein said electronically capturing said navigation surface using at most said M×N photosensitive elements as said second frames of image data includes addressing every $n^{th}$ photosensitive elements of said image sensor array to capture said second frames of image data, where n is an integer greater than one.

3. The method of claim 2 wherein said addressing every $n^{th}$ photosensitive elements of said image sensor array includes addressing every other photosensitive elements of said image sensor array to capture said second frames of image data.

4. The method of claim 1 wherein said electronically capturing said navigation surface using at most said M×N photosensitive elements as said second frames of image data includes addressing blocks of said M×N photosensitive elements of said image sensor array to capture said second frames of image data, each sampled signal of said second frames of image data corresponding to one of said blocks.

5. The method of claim 4 wherein said addressing said blocks of said M×N photosensitive elements of said image sensor array includes addressing 2×2 blocks of said M×N photosensitive elements of said image sensor array to capture said second frames of image data.

6. The method of claim 1 wherein said electronically capturing said navigation surface using at most said M×N photosensitive elements as said second frames of image data includes addressing a portion of said M×N photosensitive elements of said image sensor array to capture said second frames of image data.

7. The method of claim 6 wherein said addressing said portion of said M×N photosensitive elements of said image sensor array includes addressing a 32×32 pixel portion of said M×N photosensitive elements of said image sensor array, said image sensor array being a 64×64 image sensor array.

8. The method of claim 1 wherein said M×N photosensitive elements of said image sensor array are between 5 μm to 20 μm in size.

9. The method of claim 1 further comprising injecting ions onto said navigation surface to neutralize micro-particles on said navigation surface.

10. A system for optical navigation, said system comprising:
   an image sensor array including M×N photosensitive elements positioned to receive light reflected from a navigation surface;
   a decoding unit operatively connected to said image sensor array to selectively address said M×N photosensitive elements of said image sensor array;
   a mode selector operatively connected to said decoding unit to set an image capturing mode to one of a first operational mode and a second operational mode based on said navigation surface;
   a processor operatively connected to said decoding unit and said mode selector to instruct said decoding unit to selectively address said M×N photosensitive elements of said image sensor array depending on said image capturing mode, said processor being configured to instruct said decoding unit to selectively address said M×N photosensitive elements of said image sensor array to capture first frames of image data of said navigation surface when said image capturing mode is set to said first operational mode such that each of said first frames of image data includes M×N sampled signals, said processor further being configured to instruct said decoding unit to selectively address at most said M×N photosensitive elements to capture second frames of image data of said navigation surface when said image capturing mode is set to said second operational mode such that each of said second frames of image data includes less than M×N sampled signals; and
   an image processing module operatively connected to said image sensor array to receive said first and second frames of image data, said image processing module being configured to correlate said first and second frames of image data to determine relative displacements using at least some of said first and second frames of image data, said image processing module being configured to calculate said relative displacements using said first frames of image data when said image capturing mode is set to said first operational mode, said image processing module being configured to calculate said relative displacements using said second frames of image data when said image capturing mode is set to said second operational mode.

11. The system of claim 10 wherein said processor is configured to instruct said decoding unit to address every $n^{th}$ photosensitive elements of said image sensor array to capture said second frames of image data when said image capturing mode is set to said second operational mode, where n is an integer greater than one.

12. The system of claim 11 wherein said processor is configured to instruct said decoding unit to address every other photosensitive elements of said image sensor array to capture said second frames of image data when said image capturing mode is set to said second operational mode.

13. The system of claim 10 wherein said processor is configured to instruct said decoding unit to address blocks of said M×N photosensitive elements of said image sensor array to capture said second frames of image data when said image capturing mode is set to said second operational mode, each sampled signal of said second frames of image data corresponding to one of said blocks.

14. The system of claim 13 wherein said processor is configured to instruct said decoding unit to address 2×2 blocks of said M×N photosensitive elements of said image sensor array to capture said second frames of image data when said image capturing mode is set to said second operational mode.

15. The system of claim 10 wherein said processor is configured to instruct said decoding unit to address a portion of said M×N photosensitive elements of said image sensor array to capture said second frames of image data when said image capturing mode is set to said second operational mode.

16. The system of claim 15 wherein said processor is configured to instruct said decoding unit to address a 32×32 pixel portion of said M×N photosensitive elements of said image sensor array when said image capturing mode is set to said second operational mode, said image sensor array being a 64×64 image sensor array.

17. The system of claim 10 wherein said M×N photosensitive elements of said image sensor array are between 5 μm to 20 μm in size.

18. The system of claim 10 further comprising an ion generator to inject ions onto said navigation surface to neutralize micro-particles on said navigation surface.

19. A system for optical navigation, said system comprising:
- a light source configured to emit light;
- an image sensor array including M×N photosensitive elements positioned to receive the light reflected from a navigation surface;
- an ion generator configured to inject ions onto said navigation surface;
- a decoding unit operatively connected to said image sensor array to selectively address said photosensitive elements of said image sensor array;
- a processor operatively connected to said decoding unit to instruct said decoding unit to selectively address said M×N photosensitive elements of said image sensor array to capture said navigation surface as frames of image data; and
- an image processing module operatively connected to said image sensor array to receive said frames of image data, said image processing module being configured to correlate said frames of image data to determine relative displacements using at least some of said frames of image data,
- wherein said light source, said image sensor, said ion generator, said decoding unit, said processor and said image processing module are included in an optical computer mouse.

20. The system of claim 19 wherein said processor is configured to instruct said decoding unit to selectively address said M×N photosensitive elements of said image sensor array to capture first frames of image data of said navigation surface when an image capturing mode is set to a first operational mode such that each of said first frames of image data includes M×N sampled signals, said processor further being configured to instruct said decoding unit to selectively address at most said M×N photosensitive elements to capture second frames of image data of said navigation surface when said image capturing mode is set to a second operational mode such that each of said second frames of image data includes less than M×N sampled signals.

* * * * *